(12) United States Patent
Johannesen et al.

(10) Patent No.: US 9,626,539 B2
(45) Date of Patent: Apr. 18, 2017

(54) DEVICE, SYSTEM AND METHOD FOR IDENTIFICATION OF OBJECT IN AN IMAGE, AND A TRANSPONDER

(71) Applicant: ID TAG TECHNOLOGY GROUP AS, Lillehammer (NO)

(72) Inventors: Erik Johannesen, Lillehammer (NO); Bard Myhre, Oslo (NO); Bengt Holter, Asker (NO)

(73) Assignee: ID TAG TECHNOLOGY GROUP, Lillehammer (NO)

( * ) Notice: Subject to any disclaimer, the term of this patent is extended or adjusted under 35 U.S.C. 154(b) by 19 days.

(21) Appl. No.: 14/424,292

(22) PCT Filed: Aug. 30, 2013

(86) PCT No.: PCT/NO2013/050143
§ 371 (c)(1),
(2) Date: Feb. 26, 2015

(87) PCT Pub. No.: WO2014/035257
PCT Pub. Date: Mar. 6, 2014

(65) Prior Publication Data
US 2015/0235064 A1    Aug. 20, 2015

(30) Foreign Application Priority Data
Aug. 31, 2012 (NO) .................................. 20120982

(51) Int. Cl.
*H04Q 5/22* (2006.01)
*G06K 7/10* (2006.01)

(52) U.S. Cl.
CPC ..... *G06K 7/10366* (2013.01); *G06K 7/10316* (2013.01)

(58) Field of Classification Search
CPC ...................... G06K 7/10316; G06K 7/10366
(Continued)

(56) References Cited

U.S. PATENT DOCUMENTS 5,659,520 A * 8/1997 Watson ................. G01S 3/8083
342/146
6,397,334 B1  5/2002 Chainer et al.
(Continued)

FOREIGN PATENT DOCUMENTS

KR   10-2012-0115702   10/2012
WO         01/35054     5/2001
(Continued)

OTHER PUBLICATIONS

International Search Report issued Feb. 12, 2014 in corresponding International Application No. PCT/NO2013/050143.
(Continued)

*Primary Examiner* — Nader Bolourchi
(74) *Attorney, Agent, or Firm* — Wenderoth, Lind & Ponack, L.L.P.

(57) ABSTRACT

A device and method for identification of at least one object in an image registered with an image registration device, wherein each of the at least one object is provided with a wireless tag. The device includes at least one sensor for registering a wireless signal from the wireless tag and for registering at least one direction to the wireless tag, wherein the wireless signal includes identification for the object.

40 Claims, 11 Drawing Sheets

(58) Field of Classification Search
USPC .................................................. 340/10.1
See application file for complete search history.

(56) References Cited

U.S. PATENT DOCUMENTS

| | | | |
|---|---|---|---|
| 7,388,496 | B1 | 6/2008 | Halcrow et al. |
| 7,873,326 | B2 * | 1/2011 | Sadr .................... G06K 7/0008 343/700 MS |
| 2004/0169587 | A1 | 9/2004 | Washington |
| 2005/0104956 | A1 | 5/2005 | Ono et al. |
| 2005/0229227 | A1 | 10/2005 | Rogers |
| 2007/0288499 | A1 | 12/2007 | Dunko |
| 2008/0204322 | A1 * | 8/2008 | Oswald ................. G01S 5/04 342/465 |
| 2008/0211631 | A1 | 9/2008 | Sakamoto |
| 2009/0009626 | A1 | 1/2009 | Ko et al. |
| 2009/0303006 | A1 | 12/2009 | Eggers et al. |
| 2010/0103173 | A1 | 4/2010 | Lee et al. |
| 2011/0001659 | A1 * | 1/2011 | Hampel ................. G01S 3/74 342/120 |
| 2012/0068813 | A1 * | 3/2012 | Karttaavi .............. G01S 13/74 340/5.2 |
| 2013/0314534 | A1 | 11/2013 | Hinman et al. |

FOREIGN PATENT DOCUMENTS

| | | |
|---|---|---|
| WO | 2005/045455 | 5/2005 |
| WO | 2010/105633 | 9/2010 |
| WO | 2012/155343 | 11/2012 |
| WO | 2014/121521 | 8/2014 |

OTHER PUBLICATIONS

International Preliminary Report on Patentability issued Nov. 20, 2014 in corresponding International Application No. PCT/NO2013/050143.

Norwegian Search Report issued Jan. 22, 2014 in corresponding Norwegian Application No. 20120982.

Pavel V. Nikitin et al., "Phase Based Spatial Identification of UHF RFID Tags", 2010 IEEE International Conference on RFID, Apr. 14-16, 2010, pp. 102-109.

Greg Hislop et al., "A prototype 2D direction finding system with passive RFID tags", in Proc. European Conference on Antennas and Propagation, Apr. 2010, Barcelona, Spain.

Raed M. Shubair et al., "A Setup for the Evaluation of MUSIC and LMS Algorithms for a Smart Antenna System", Journal of Communications, vol. 2, No. 4, Jun. 2007, pp. 71-77.

Extended European Search Report issued Feb. 25, 2016 in corresponding European Patent Application No. 13833690.4.

* cited by examiner

DEVICE, SYSTEM AND METHOD FOR IDENTIFICATION OF OBJECT IN AN IMAGE, AND A TRANSPONDER

INTRODUCTION

The present invention concerns a device, a system, and a method for identification of objects in a digital image. The invention also concerns a wireless transponder device.

BACKGROUND

Social media on the internet have the recent years contributed in changing people's way of communication. Continuing increasing capacity and presence of wireless networks have in addition contributed to that it is now possible to communicate via social media almost from anywhere someone is located. This has brought about that people in continuing increasingly degree uses social networks in order to pass on and exchange information of what one does or takes part in. This is communicated either in the form of text, image, video, or a combination of these. This way of communication is spreading in society and has become enormously popular worldwide.

A particular use of this technology is to find oneself or others in images shared with friends in social networks. To make oneself visible in this way illustrates a need or a wish to show that one is taking part in something, either alone or together with others. Today one has to identify oneself or others in an image manually or by image recognition. For this a tag is used. In addition to the meaning electronic label, the word tag is also used in social networks on the internet for the act of finding or publishing information in lists/images. On Facebook it is most often used about the act of identifying or referring to persons in an image.

US2007/0288499 describes a solution where a mobile phone with camera or a digital camera/video camera is provided with an RFID reader. An RFID transponder tag is arranged in a point of interest, e.g. an historical monument. The tag has stored thereon data about the historic monument which is transmitted to the RDID reader on the camera. A user of the camera may then take an image of and also receive information about the monument. The multimedia file will then be tagged, and the improved multimedia file may then be able to contain information which was read by the RFID reader about the monument together with the image, which later may be experienced locally by the user. The tag may be supplemented with generated time/date or a GPS position from the mobile.

US 2010/0103173 A1 concerns a method for tracking an object in an image, where the position of the object in the 3D space is determined. An RF tag (e.g. an RFID tag) is attached to the object. The system uses trilateration and an external positioning apparatus must be arranged close to the object for receiving the signals from the RF tag. Trilateration requires that three (or more) transmitter/receiver units are placed surrounding the ID tags that shall be positioned. By measuring the time it takes for a signal to travel from an ID tag to three different points in space, it is possible by triangulation to determine the point in space from which the signal was transmitted and thereby enable determination of the position of the ID tags.

Hislop, D. Lekime, M. Drouguet, and C. Craeye, "A prototype 2D direction finding system with passive RFID tags," in Proc. European Conference on Antennas and Propagation, April 2010, Barcelona, Spain, concerns a system for refinding passive RFID tags along a corridor inside a warehouse. A digital camera is arranged in the middle of an antenna arrangement. Camera with antennas is placed in a fixed position in a warehouse with known dimensions. The location of the passive RFID tag will be registered and its position may be marked on an image. The system is not designed to solve the need of which the present invention is focused, as the system is based on dedicated readers that are not owned by common people and that do not have a practical size. The system is also developed for refinding items where one knows what one is looking for. The system provides a confirmation that the item is present and where it is.

An alternative wireless position technology is GPS. It may be used to provide information about where an image is taken (photographic position), but does not alone provide any information about what or who is present in the image.

US2005/0104956 describes a system for personal identification of imaged products. Information from a tagged item is combined with an image of the item itself. The tag is in the form of a RF tag. In order to establish an estimate of the direction to a tagged object relative to the imaging device, a moving image is required. The moving image enables each individual RF tag to be tracked by an imaging device using a high directivity antenna beam at its maximum peak. The information obtained from the tagged objects serve as information in a dedicated database, where it is used to find a match between similar imaged products. However, when the antenna is of limited size, as will be the case for antennas on imaging devices as mobile phones it may not be possible to produce a high directivity radiation pattern in order to locate the RF tag. Also multipath propagation creates false signals a problem which is unsolved in the prior art.

BRIEF SUMMARY OF THE INVENTION

The invention seeks to find a solution to the problems described above. The invention is defined in the appended claims.

The invention provides a concept for identification of at least one object in an image registered with an image registration device. The at least one object is provided with a wireless tag with identification information related to that object. The device comprises at least one sensor for registering a wireless signal from the wireless tag wherein the wireless signal comprises information for identification of the at least one object. The wireless signal are also used for registering at least one direction to the wireless tag of the at least one object.

The at least one object may accordingly be identified and the position to the at least one object may be determined in the image.

The invention provides a device for identification of at least one object in an image registered with an image registration device, where each of the at least one objects is provided with a wireless tag having stored thereon identification information related to the object, the device for identification comprising:

at least one transmitter operable for transmitting at least one interrogation signal;

at least two sensors operable for detecting wireless response signals from wireless tags responding to the at least one interrogation signal, wherein the wireless response signal from a wireless tag comprises identification information related to that object, wherein a direction to each of the wireless tags is estimated based on a phase difference of the wireless response signals detected by the at least two sensors.

The at least one interrogation signal may comprise a radiation null. The at least one transmitter may be provided by at least one of the at least two sensors. The device for identification may further be operable for allowing detection only of the wireless response signals detected by the at least two sensors within a time window after transmission of the at least one interrogation signal. The at least two sensors and the transmitter may be antennas operable for receiving electromagnetic signals. The transmitter may be a radio frequency transmitter and the at least two sensors may be radio frequency receivers, or the transmitter may be an acoustic transmitter and the at least two sensors may be acoustic receivers, or the transmitter may be an infrared transmitter and the at least two sensors may be infrared receivers, or the transmitter may be operable to transmit visible light and the at least two sensors may be operable to receive visible light.

The device may further comprise a processing device suitable for processing of the registered identification information from the wireless ID-tag and the registered direction of the wireless ID-tag together with image data for the image registered with the image registration device.

The registration and the processing may be performed real time. The sensor for registration of the wireless signal may be arranged in the image registration sensor of the image registration device of the terminal. (In the CMOS chip.) The device may further comprise a memory unit operable for storing the information and position of the identified at least one object together with the image of the at least one object.

In an embodiment the wireless ID-tag may be an RFID-tag and the sensor for registering the wireless signal may be an RFID reader with at least two antennas. The device may be provided with a matrix of RFID antennas. The RFID tag may be an active RFID tag or a passive RFID tag. The wireless ID-tag may be arranged in a terminal, in a cover of a terminal, or on an item to be worn by a person as e.g. in a watch, on jewelry, a bracelet or in an ID card, or in a unit to be arranged on a building or commodity.

The device may be integrated in a terminal. The device may comprise a display device for displaying an image registered with the image registration device. The terminal may be one of a mobile phone, a camera, a film/video camera, a PC or a tablet. Alternatively, the device may be arranged to be mounted on at least one of a mobile phone, a camera, a film/video camera, a PC or a tablet. The device may be designed as a cover.

The image registration device may be a camera or a film/video camera. The at least one object may be buildings, items/articles, persons or animals. The information may be at least one of text, audio, video, name, address, e-mail or reference to information stored on the internet.

In a further aspect the invention provides a method for identification of at least one object in an image, wherein each of the at least one object is provided with a wireless tag having stored thereon identification information related to the object, the method comprising:

transmitting at least one interrogation signal, detecting by at least two sensors wireless signals from wireless tags responding to the at least one the interrogation signal, wherein the wireless signals comprise information for identification of the objects; and estimating at least one direction of each of the wireless tags responding to the at least one interrogation signal based on a phase difference in the detected wireless signals.

The at least one interrogation signal may comprise a radiation null. The method may further comprise detecting only the wireless response signals arrived in a time window after transmission of the at least one interrogation signal. The interrogation signal may comprise a first radiation pattern with an intensity maximum. The method may comprise scanning an angular range by processing the response signals detected by the at least two sensors.

The interrogation signal may further comprise a second radiation pattern comprising a radiation null. The method may further include scanning an angular range in a field of view of the imaging device by using a radiation pattern comprising a radiation null.

The at least one interrogation signal and the wireless signals may be electromagnetic signals or acoustic signals. The electromagnetic signals may be radio waves, infrared light or visible light.

Registering the wireless signal from the wireless ID-tag may further comprise detecting visible light or IR light in an image chip or main sensor in the digital image registration device. Registering the wireless signal from the wireless ID-tag may further comprise detecting acoustic sound waves received by the at least two sensors. Registering and processing may be performed in real time. Processing of identification and direction information may further comprise position determination of the wireless ID-tag.

The method may further comprise registering the image with an image registration device. The method may further comprise processing of the registered identification information from the wireless ID-tag and the registered direction of the wireless ID-tag together with the image data from the image registration device. The image may be displayed on a display device together with information assigned to each one of the at least one object. Displaying may be performed in real time.

The image may be stored on a storage device together with information assigned to each one of the at least one object.

In a further aspect the invention provides a computer program stored on a computer readable medium comprising computer readable program code for performing the method for identification of at least one object according to the method described above.

In an even further aspect the invention provides a wireless transponder device suitable for identification of at least one object in an image, where the wireless transponder device is assigned to the at least one object and where the identification of the at least one object and an estimation of at least one direction to the wireless transponder device is enabled by registration of at least one wireless signal from the wireless transponder device, wherein the at least one wireless signal comprises information for identification of the at least one object, and wherein registration of the wireless signal and estimation of at least one direction to the wireless transponder device is performed with the method above, the transponder device comprising:

a storage device for storing information for identification of the at least one object;

a transmitter for transmitting a wireless signal where the wireless signal comprising the stored information for identification of the at least one object. The transponder device may be an RFID-tag.

In an even further aspect the invention provides a system for identification of at least one object in an image, the system comprising at least one wireless transponder device according to above; and a device for identification of at least one object in an image registered with an image registration device as defined above. A processing device suitable for processing of the registered identification information from the wireless ID-tag and the registered direction of the wireless ID-tag together with the image data of the image registered with the image registration device may be included in the system.

The present invention may be used in obtaining information about objects in an image, and as to where in the image the object is located. This information may be obtained automatically and in real time.

The RFID technology enables registration of an object even if the reader does not have free sight to the wireless tag. The RFID technology is traditionally only used in detecting whether an object is present or not, and not as to where the object is located in view of the position of the reader.

Direct direction estimation of the signal received by the tag (angle-of-arrival detection) does not require arrangement of external transmitter/receiver-units surrounding the wireless tag in order to find its position such as in US 2010/0103173 A1. Also use of at least two sensors and estimating a phase difference between wireless signals received by these two sensors do neither require arrangement of external transmitter/receiver-units surrounding the wireless tag in order to find its position. In the present invention all transmitter/receiver equipment may be arranged in the same unit arranged on the camera itself. With the present invention a user of a camera/film camera or terminal with camera (the terminal may e.g. be a mobile phone, a camera, a film/video camera, a PC or a tablet) may anywhere take a digital photographic image in real time and obtain information directly and in real time in the image uniquely identifying each object in the image provided with a wireless ID-tag. The invention enables personalization of interactive imaging and more available to common people.

Today's known solutions require that the information to be introduced into the image is known in advance. With the present invention it is the wireless ID-tag in itself that in an instant provides the information in the image.

With the present invention mobile devices can be used to generate interactive images in real time. The direction to tagged objects can be estimated from a mobile device without requiring a moving image. By using a procedure with multiple antennas, the present invention provides a solution able to locate the presence of tagged objects in the same area as viewed by an optical lens.

The present invention provides wireless real time identification of tagged objects and generation of interactive images using a mobile imaging device such as a smart phone or electronic tablet. The imaging device of the present invention may acquire information wirelessly from tagged objects and then integrates and displays the acquired information inside a captured image close to or at the actual tag locations in the form of virtual tags. The virtual tags may be clickable hyperlinks that provide information of the imaged (tagged) objects, and they may be incorporated into the image in such a way that when it is shared on a social network or submitted as an multimedia message from a smart phone, they travel along with the image as an integral part of it. This allows any receiver of the image to see and interactively access the information provided by all the tagged objects in the image. The present invention thus provides an enabling technology for generating interactive images in real time on smart phones.

BRIEF DESCRIPTION OF DRAWINGS

Example embodiments of the invention will now be described with reference to the drawings, in which.

DETAILED DESCRIPTION

The invention concerns identification of marked objects (persons or products) in an image. The invention provides information about what or who is in the image, and where in the image the marked objects are located. The positions of the objects may be determined. The image may be displayed on the display of a terminal. The information may be provided in real time. The image may be a digital image.

Figure 1:
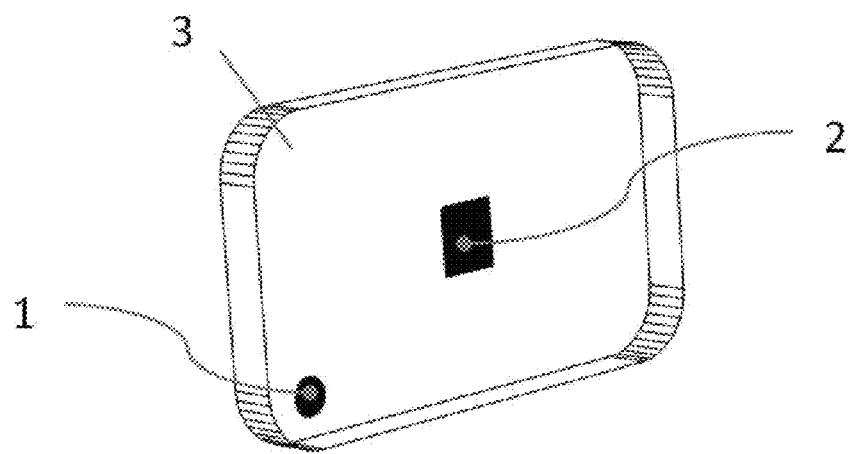
FIG. 1 shows a terminal with a camera and sensor for reading of wireless tags.

A terminal 3 with an image registration device 1 and sensor 2 for reading of a wireless tag is shown in FIG. 1. The image registration device may be a camera, a film camera or a film/video camera. The terminal may e.g. be a mobile terminal, a handheld terminal, a stationary terminal, a mobile phone, a camera, a film/video camera, a PC or a tablet. The image may be a photographic picture or a film. The image registration device may be a digital device.

The objects to be detected are marked with an identification tag (wireless tag or wireless ID-tag). Such a wireless ID tag is normally named a "tag". The wireless ID tag ("tag") may communicate wirelessly with the sensor 2 of the terminal 3 which can take images. The wireless ID tag transmits a wireless signal with information for identification of the object to which the wireless ID tag is attached. The wireless signal is also used by the sensor for registration of at least one direction of the wireless ID tag. When the terminal is used for registration of objects located within the field of view of the image registration device 1, the sensor 2 will read the wireless signals from the wireless ID tags.

The information in the wireless signals from each wireless ID tag will be registered and further processed in a processing device for combination of identification and directional information from the wireless ID tags with image date from the digital camera. The image is displayed on a display device on the terminal together with information associated with each of the tagged objects in the image. The combination of the image data with the information from the registered wireless signals, and display of the resulting image with information associated with the marked objects may be performed in real time.

The wireless ID tags may be based on transmission of electromagnetic signals, visible light or infrared light (IR), or acoustic waves. The sensor may be arranged for receipt of these signals. The sensors may accordingly be RFID readers, or be constituted by the image chip or the main sensor in a camera/digital camera, or be microphones arranged on the terminal.

It may be envisaged embodiments with wireless ID tags transmitting continuously, transmitting in intervals or transmitting intermittently, or wireless ID tags requiring triggering of an interrogation pulse.

In an example of an embodiment of the invention registering ID tags transmitting continuously or in intervals, the sensors will register from which direction the signals from the different wireless signals come from when the camera in a mobile phone/camera/tablet is used for taking an image. The information stored in the wireless ID tags is also registered by the sensors. Information and position from each wireless ID tag located within the area of the camera lens will then be combined and presented simultaneously in the photographic image. Each object in the image provided with a wireless ID tag will then accordingly be identified in the photographic image. This may be done in the camera either automatically or by turning on an application, or by transferring the image to a PC.

In a further example embodiment registering ID tags arranged to be trigged by an interrogation pulse, would the transmitter on the mobile terminal transmit a signal that may be registered by the wireless ID tags located within an area corresponding to the area exposed to the optical lens of the camera, when the camera in such an embodiment mobile phone/camera/tablet is used to register an image. The wireless ID tags within the reach of the transmitter would respond by transmitting back information stored into the wireless ID tags. The information is registered in the camera. Sensors register in which direction the signals from the different wireless ID tags comes from. Information and position from each wireless ID tag locate within the area of the camera lens, would then be combined and presented simultaneously in the photographic image. Each object in the image provided with a wireless ID tag would accordingly be identified in the photographic image. This may be done in the camera either automatically or by turning on an application, or by transferring the image to a PC.

Embodiments of the invention with both transmitter and receiver on the terminal may be arranged to register all types of wireless ID tags. When the mobile phone/camera/tablet is used to capture an image, the transmitter and sensors may be activated in such a way the wireless ID tags located within the area of the camera lens are registered.

The invention will thus enable registering of what or who is in the image, and where in the image the different wireless ID tags are located. With position it is meant in this context that one is able to find the position of identified objects in the image, where the position in this case is not a geographic position (as in a GPS coordinate), but a relative position of an object within the frame of an image. Direct direction estimation of the signal received from the ID tag may be used (angle-of arrival detection) to find the position of the ID tag.

For a person the wireless ID tag may e.g. contain the name of the person and email address, while for a product it may contain product information and an internet address to the producer of the product. As explained above the terminal may e.g. be a mobile terminal, a handheld terminal, a stationary terminal, a mobile phone, a digital camera, a digital film/video camera, a PC or a tablet. In the following description of example embodiments of the invention the terminals in the drawings are exemplified in the form of a mobile phone. The following examples are not intended to be delimiting for the scope of the invention.

Example Embodiment

RFID Technology

An embodiment comprises a combination of:
1. Wireless position technology
   wireless detection of wireless ID tags (RFID technology; RFID ((Radio Frequency IDentification))
2. Digital photographic technology
   presentation of position and information of wireless ID tags in a digital image RFID technology is based on wireless electromagnetic transmission of data. The wireless ID tag that are attached to the objects that are going to be detectable are named an RFID tag (or only a tag), while the transmitter/receiver unit reading the information on the RFID tags is called an RFID reader. The mobile terminal with camera used for detecting RFID tags in an image is provided with an RFID reader. Traditionally only one antennae is used in an RFID reader, because it is only desirable (and necessary) to detect whether an RFID tag is present or not. If one wishes to find the direction of the signal from the RFID tag it is however necessary to use a minimum of two antennas for receiving the signal. The signals from the RFID tag will then be received at different times by the different antennas in the reader, and the time difference may be recalculated to a phase difference in frequency. This again enables estimating the angle of the signal in view of the antennas when the frequency of the signal is known. In this way it is possible to not only detect whether an RFID tag is present or not, but also where the tag is located in relationship to the RFID reader. The more antennas used in the RFID reader, the more accurate angular resolution is it possible to achieve. The concept may thus be realized through arranging a matrix of antennas on a camera (or on a mobile phone/tablet with camera).

Figure 2:
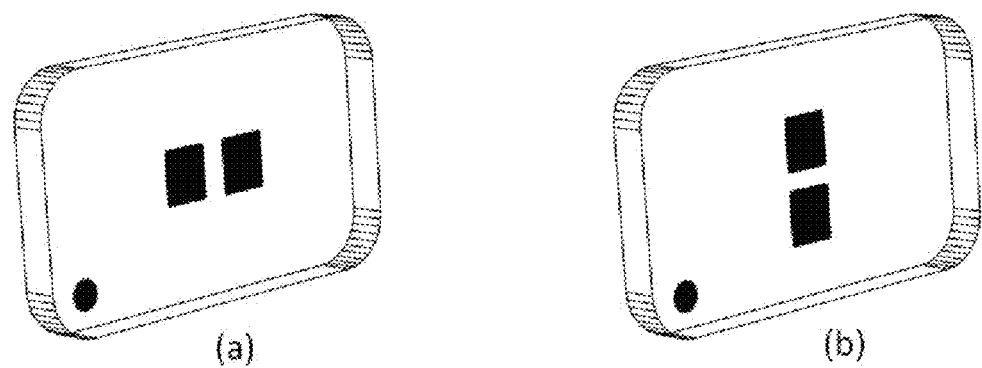
FIG. 2 shows a terminal with a camera and reader of wireless tags, where the reader comprises two sensors arranged either (a) horizontally or (b) vertically.

FIG. 2 shows an embodiment of a terminal 3 with a camera 1 and reader of wireless ID tag 2, where the reader comprises two sensors distributed either (a) horizontally or (b) vertically. Two sensors in the reader provide the opportunity of direction determination of the wireless signals from the wireless ID tags in the plane the wireless sensors are distributed. The embodiment in FIG. 2 enables thus estimation of the direction of a wireless ID tag in the horizontal plane (a) or the vertical plane (b) accordingly. (The angle to the wireless ID tag in the vertical plane will be zero for horizontal distribution of sensors. The angle to the wireless ID tag to the wireless ID tag in the horizontal plane would be zero for a vertical distribution of sensors.) The angle to the wireless ID tags that are not located in the given plane will be equal to the angle of the projection of the wireless ID tags either down into the horizontal plane or the vertical plane. To be able to estimate the direction to a wireless ID tag both horizontally and vertically, two or more sensors are arranged both horizontally and vertically.

Figure 3:
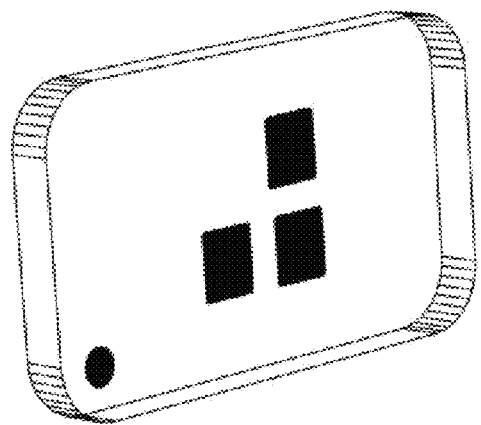
FIG. 3 shows a terminal with a camera and reader of wireless tags, where the reader comprises three sensors.

FIG. 3 shows an embodiment of a terminal 3 with camera 1 and reader of wireless ID tag 2, where the reader comprises three sensors. The three sensors are arranged such that they provide the opportunity of direction determination of the wireless signals from the wireless ID tags both horizontally and vertically.

Figure 4:
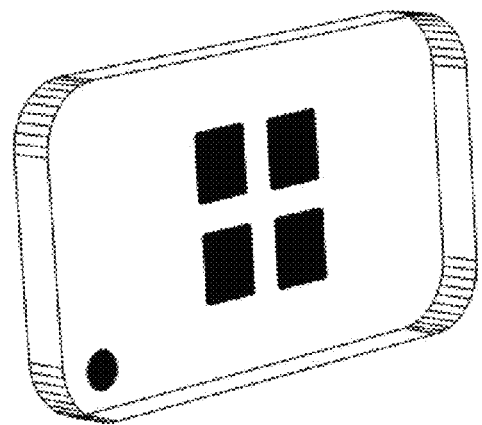
FIG. 4 shows a terminal with a camera and reader of wireless tags, where the reader comprises four sensors distributed as a 2×2 matrix.

FIG. 4 shows an embodiment of a terminal 3 with camera 1 and reader of wireless ID tag, where the reader comprises four sensors distributed as a 2×2 matrix. The four sensors are arranged to enable the possibility for direction determination of the wireless signals from the wireless ID tags both horizontally and vertically.

Figure 5:
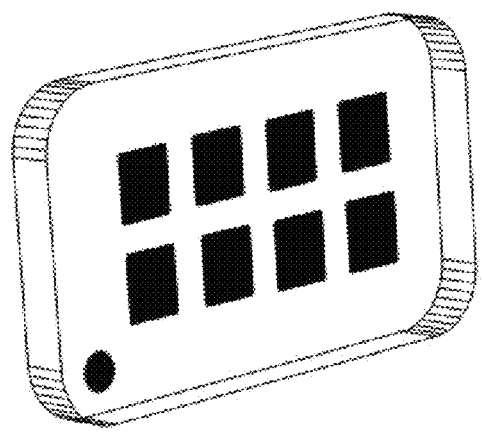
FIG. 5 shows a terminal with a camera and reader of wireless tags, where the reader comprises eight sensors distributed as a 2×4 matrix

FIG. 5 shows an embodiment of a terminal 3 with digital camera 1 and reader 2 of wireless ID tag, where the reader comprises eight sensors distributed as a 2×4 matrix. The four sensors are arranged to enable the possibility for direction determination of the wireless signals from the wireless ID tags both horizontally and vertically.

In FIG. 2 the terminal 3 is rotated such that the antennas are situated in the plane of which direction estimation is desired. In FIG. 2(a) the antennas are situated in the horizontal plane. If it is desired to estimate the direction in the vertical plane by using the antennae in FIG. 2(a), the terminal 3 in FIG. 2(a) is rotated 90 degrees such that the antennae is situated in the horizontal plane. In FIG. 2(b) the antennae is situated in the vertical plane. If it is desired to estimate the direction in the horizontal plane by using the antennae in FIG. 2(b), the terminal 3 in FIG. 2(b) is rotated 90 degrees such that the antennae is situated in the horizontal plane. With the embodiments in FIGS. 3 and 4 the advantage of not having to rotate the terminal 90 degrees is achieved, since no matter how the terminal 3 is held there will be a minimum of two antennas arranged in either the horizontal plane or the vertical plane. The difference between FIGS. 3 and 4 is only to illustrate how the antennas may be arranged if one has 3 or 4 antennas accordingly.

How many sensors that can be placed on a terminal depend upon the size of the terminal. Typical sizes of today's cameras indicate that there would be space for a simple resonant patch antenna at 5.8 GHz. On the backside of today's mobile phones up to 8 antennas may be placed if resonant patch antennas at 5.8 GHz are used. Upon placement of such antennas on today's tablets it is possible to arrange for up to 54 antennas. The sensor for registering the wireless signal may also be arranged in the image registration sensor of the image registration device in the terminal. In a camera the sensor may be integrated in the CMOS chip itself that registers the image.

Figure 6:
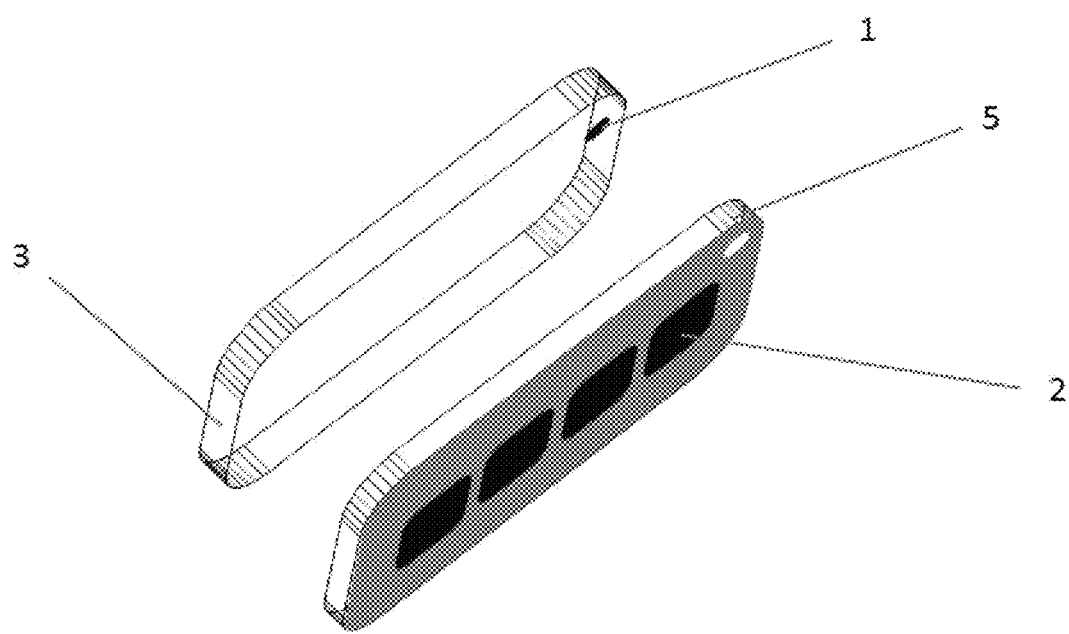
FIG. 6 shows an embodiment, the invention is mounted as a cover on the mobile terminal.

FIG. 6 shows an embodiment where the invention is in the form of a separate cover 5 containing antenna and possibly extra electronics. This provides the possibility that the invention also may be an external unit that may be extra equipment easily mountable on the mobile terminal 3 with camera. The description of the different configurations of reader with antennas as described above in connection with FIGS. 1-5 would also be possible embodiments for the antennas on the external unit.

RFID-Tags

The RFID tags may either be passive or active. The difference between passive and active tags is that passive RFID tags do not have an internal battery for transmitting information, in contrast to active tags that has an internal battery. Passive tags draw energy from the RFID reader and transmit back information to the reader by modulating its own radar cross section. This results in a relatively small range of passive tags. Active tags however are not dependent upon the energy from the reader to transmit information. The energy from the reader functions in this case as a signal telling the RFID tag to wake up from a power saving mode and respond by transmitting back information. Active tags use their own internal battery to do this. This enables realization of a far longer range than for passive tags. In addition it is possible to turn off and turn on the RFID tag. This means that it is possible to turn off (inactive if one does not wish to be identified), e.g. due to protection of personal privacy. The RFID tag may be a cover on a mobile phone, a watch, a bracelet, or an ID card. In some cases it may be desirable to use the RFID tag as a visible symbol to show that one supports something, e.g. as the yellow bracelet of Lance Armstrong, that made visible the support to the cancer action.

Determination of the Direction of a Wireless RFID Tag

Example 1

The directional directivity of an antenna is proportional to its effective area A. This means that the physical size of the antenna affects the width of the main lobe/beam. The angular resolution may thus be increased by increasing the physical size of the antenna. In some cases this is however not practical or less desirable to do. An example is antennas used in mobile terminals. These are typically limited in size as the terminals are relatively small, and there is not much desire in increasing the physical size of the antennas even if this may contribute to increase the performance. A small antenna however calls for a wide main lobe, something that corresponds to reduced or lower directional directivity. In such cases it would not be possible to discriminate between the directions of multiple signals if the signals are received within the main lobe of the antenna. It is however possible to achieve higher angular resolution by using a group antenna (assembly of several single antennas) and estimate the direction of the received signals by using signal processing based on linear algebra. This signal processing technique is called "subspace", since it is based on generating a correlation matrix of the received signals and then divide this matrix in two subspaces called signal room and noise room. The estimation of the direction of each single signal takes place by finding directions in space where the signal room is orthogonal to the noise room. The directions in the space where this occur correspond to the estimated directions for the incidental signals. This signal processing technique involves estimations based on phase difference.

The estimation of the direction may in an embodiment be performed by an algorithm called MUSIC. This algorithm is described in: Shubair et al. "A setup for the Evaluation of MUSIC and LMS Algorithms for a Smart Antenna System"; Journal of Communications, Vol. 2, No. 4, June 2007, which is hereby incorporated by reference in its entirety.

The normalized angular spectrum for the MUSIC algorithm is defined as:

$$P(\theta) = \frac{A^H A}{A^H V_n V_n^H A}$$

where A is a signal matrix defined as $A=[a(\theta_1), a(\theta_2), \ldots, a(\theta_M)]$, $(\cdot)^H$ is an Hermitian operator (transposed and complex conjugated), and $a(\theta_m)$ is a control vector representing the response of the group antenna in the direction $\theta_m$. The control vector is defined as $a(\theta_m)=[e^{j(n-1)\beta_m}]^T$ for $1 \leq n \leq N$, where $(\cdot)^T$ is a transposed operator and $\beta_m$ represents electrical phase shift between two antennas of the group antenna arranged to the side of the group antenna. $V_n$ is a matrix consisting of an eigenvector of the noise and which ideally shall be orthogonal to the vectors in A in the direction of the received signals. Since $P(\theta)$ consists of an inner product between $V_n$og A in the denominator this means that $P(\theta)$ has a maximum when A and $V_n$ is orthogonal to each other. The received signals arrive from directions in space where this occurs.

Example 2

A. Detection of Tags in Front of the Camera

Figure 12:
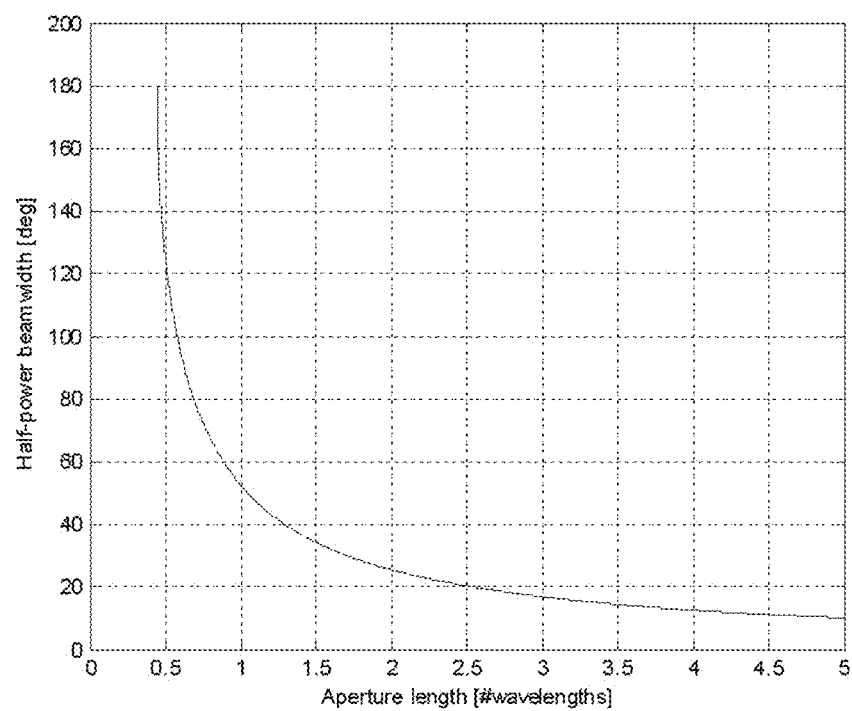
FIG. 12 illustrates half-power beamwidth (HPBW) as a function of aperture length.

In the conventional art of RF tag detection as explained earlier, the purpose is commonly to detect an RF tag wherever it is, i.e. the direction of the RF tag relative to an interrogator is not relevant. However, in the present invention it is an essential part of the invention to estimate the direction to nearby tags. The prior art solution in US2005/0104956 introduces a moving image so that each individual RF tag can be tracked by an imaging device using a high directivity antenna beam at its maximum peak. However, due to the small size of today's mobile phones, it can be shown from physics or electromagnetic theory that it is not possible to produce a high directivity radiation pattern using an antenna of a limited size. In fact, the physical (and electrical) size of an antenna aperture represents an important figure of merit in antenna theory, since it contributes to quantify the amount of directivity achievable from an antenna. Using the length of a rectangular shaped aperture as an example, it is observed in FIG. 12 that the half-power beamwidth (HPBW) of the main lobe from such an aperture is reduced only as the length of the aperture is increased (i.e. the directivity increases as the aperture length increases). To illustrate this further, the dimensions of the backside aperture of an iPhone 5 will be used as an example. The size of this aperture is approximately 5×10 cm. In Table I, the electrical size of this aperture is expressed in terms of the free space wavelength of three commonly used RFID frequencies. As observed in Table I, the aperture has the largest electrical size at the highest frequency.

TABLE 1

Aperture size of an iPhone 5 as a function of wavelength

| Frequency [GHz] | Wavelength λ [cm] | iPhone 5 aperture size |
|---|---|---|
| 0.865 | 34.68 | 0.14λ × 0.29λ |
| 2.4 | 12.50 | 0.40λ × 0.80λ |
| 5.8 | 5.17 | 0.96λ × 1.93λ |

According to antenna theory the half-power beamwidth $\theta_{HPBW}$ from a rectangular aperture may be expressed as $$\theta_{HPBW} = 114.6 \sin^{-1}\left(\frac{0.443\lambda}{l}\right) \text{degrees} \quad (1)$$

where $l$ is the length of the aperture and $\lambda$ is wavelength. The length of a rectangular aperture is either its height or width, but it is common to select the length in the plane in which the electrical field is oriented. From equation (1), the HPBW achievable from the aperture sizes listed in Table I can be derived, and they are presented in Table II.

TABLE II

Half-power beamwidths $\theta_{HPBW}$ obtained from the apertures defined in Table I using an infinite ground plane

| Frequency [GHz] | $\theta_{HPBW}$ |
|---|---|
| 0.865 | N/A × N/A |
| 2.4 | N/A × 67.3° |
| 5.8 | 54.9° × 26.5° |

Note that some of the values are denoted N/A (not applicable), which happens whenever the argument of the arcsin(•) component in equation (1) becomes larger than one (l<0.443λ). For such values, the equation in (1) is not able to produce a valid number. Physically, it means that the HPBW for these values is larger than 180°, i.e. the radiation pattern of the main lobe has a very limited directivity, resulting in an almost equal amount of radiation in the entire field of view. As noted from Table II, the smallest HPBW is 26.5° obtained at 5.8 GHz. Even though this is the smallest value, it does not represent a very high directivity, and certainly not high enough to be of any practical value in determining the position of a plurality of closely placed objects very accurately. The only way to improve this value is to increase the antenna aperture, but then an imaging device of a larger size is required (assuming that the frequency of operation is fixed). This is not physically possible with todays small handheld electronic devices as mobile phones, tablets etc.

This embodiment of the present invention provides a solution tracking the direction to RF tags with a technique using the radiation pattern at its minimum, which is commonly referred to as a null, rather than at its maximum as in US2005/0104956. A minimum of two antennas is required to establish the direction to a tag in a halfplane (vertical or horizontal plane). To establish the direction to a tag in both the vertical and horizontal plane, a minimum of three antennas is required. If space on the camera allows, more antennas than the minimum required number may be exploited, and this can contribute to enhance the accuracy of the direction estimate. An antenna array may further enhance the accuracy of the direction estimate. In addition, by using an antenna array, the direction to a tag can be estimated using a single image, thus removing the requirement of using a moving image as in US2005/0104956.

In order to identify all the RF tags in front of an imaging device, a signal that allows them to respond is provided. However, as explained in the prior art, a high directivity radiation pattern that only allows the RF tags strictly in front of the imaging device to respond cannot be produced from an antenna with a very limited size. Hence, RF tags within a large area will respond. The RF tags will typically respond using omnidirectional antennas because they have no way of knowing where the imaging device is placed. As a result, the responses from the RF tags will be transmitted (and reflected) in all directions before some of them are received by the imaging device. In short, the invention provides a procedure including transmitting at least one interrogation signal, detecting by at least two sensors wireless signals from wireless tags responding to the at least one the interrogation signal, wherein the wireless signals comprise information for identification of the objects, and estimating at least one direction of each of the wireless tags responding to the at least one interrogation signal based on a phase differences in the registered wireless signals.

In the present invention the imaging device is able to distinguish between signal responses generated by tags placed in front of the camera (in view of the optical lens) and responses generated by tags elsewhere. The present invention addresses this challenge by introducing a procedure that exploits a phase difference between two or more antennas. The exploitation of a phase difference provides creation of both constructive as well as destructive interference through a two-stage procedure.

Figure 13:
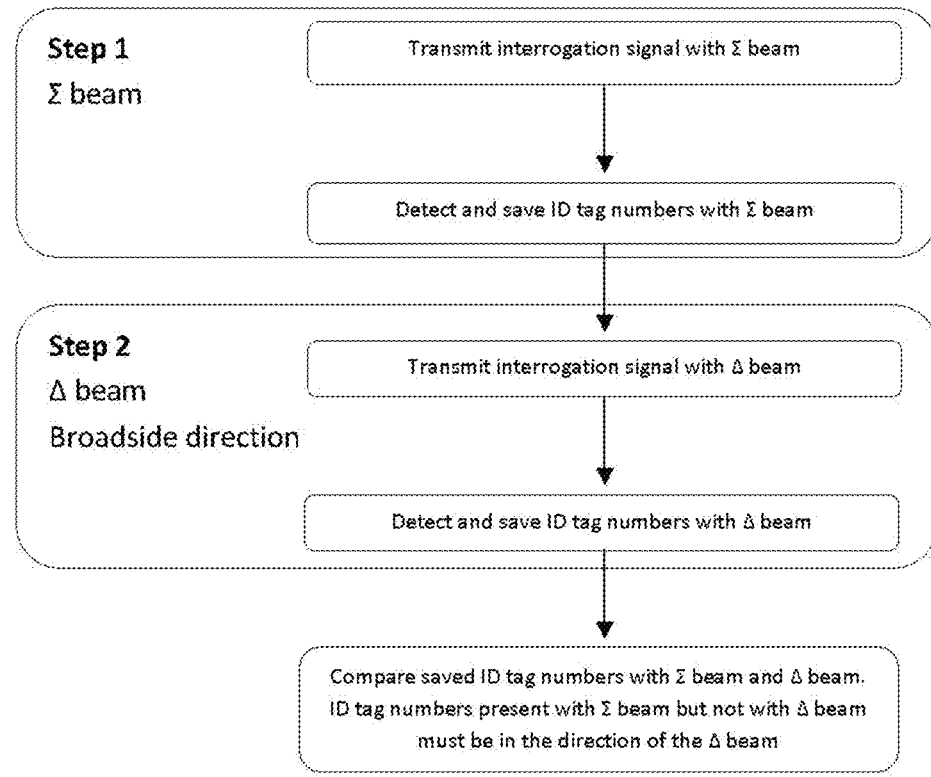
FIG. 13 is a flow chart of a procedure for identifying the RF tags in front of the imaging device.

FIG. 13 is a flow chart of the two step procedure for identifying RF tags in front of the imaging device.

Figure 14:
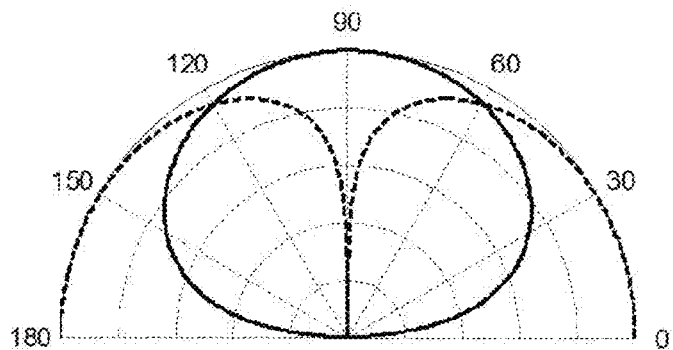
FIG. 14 illustrates a radiation pattern with a maximum in the broadside direction (Σ beam) and a a radiation pattern with a radiation null in the broadside direction (Δ beam)

In the first part (step 1 in FIG. 13) of the procedure, an interrogation signal is transmitted. An interrogation signal may be provided by exciting the two antennas in phase such that the combined radiation pattern creates a radiation pattern with a maximum in the broadside direction. The broadside direction is in front of the antennas, and thus in front of the camera. Also a single antenna may be used in creating a radiation pattern with an intensity maximum in the broadside direction. The solid line in FIG. 14 illustrates a radiation pattern with an intensity maximum in the broadside direction. Such a radiation pattern is called a sum beam or Σ beam in short. FIG. 14 illustrates intensity as a function of angle (in degrees) of the signal in front of the antennas. All the RF tags in the vicinity are allowed to respond to the interrogation signal, as the sum beam (Σ beam) will radiate in almost the entire halfplane in front of the imaging device. A sensor, e.g. in the form of a dedicated radio receiver, detects all the wireless response signals from the RF tags. The wireless response signals including the identification information related to the object are saved for the second and final part of the procedure. The identification information may include a tag identification number.

In the second part of procedure (step 2 in FIG. 13) for identifying RF tags in front of the imaging device, an interrogation signal with a radiation null in the broadside direction is transmitted. The two antennas are excited out of phase (180° phase difference) to create this radiation pattern with a radiation null in the broadside direction. This is called the Δ beam. The dotted line in FIG. 14 illustrates a radiation pattern with a radiation null in the broadside direction. The wireless response signals from the RF tags responding to the interrogation signal in this second part of the procedure are detected by the sensors. The wireless response signals including the identification information related to the object are saved.

The results obtained from using the two different beams (Σ beam and Δ beam) in this two stage procedure can be explained as follows. The RF tags that are detected with both antenna patterns (Σ and Δ) are assumed not to be directly in front of the imaging device. However, the RF tags which were present with the sum Σ beam, but disappeared with the Δ beam, must have been captured by the null of the Δ beam created directly in front of the imaging device. Hence, the RF tags which were present with the sum Σ beam, but disappeared with the Δ beam, are the RF tags that are kept and integrated into the image, since these RF tags are (compared to all the others) most likely to be found directly in front of the imaging device.

B. RF Tag Direction

In US2005/0104956, the direction to an RF tag is associated with the direction of maximum field intensity and the maximum field intensity is established by tracking a received signal through a moving image. In US2005/0104956 it is assumed that the receiver has an antenna with sufficient directivity to ensure that the received signal can be measured to be comparatively stronger in one direction than any other direction. In fact, the directivity is assumed to be so high that the concept can be used to identify several RF tags through multiple peaks in the received field intensity. As argued above, it is however not possible to produce a high directivity beam from an antenna with a limited aperture size. Hence, using only the maximum field intensity to separate individual RF tags is not an optimal approach.

The above problem of the conventional art is solved through this example embodiment of present invention by using the exact opposite, namely that of a radiation null. It is a well known fact from antenna theory that a radiation null is much sharper than a beam at maximum intensity. Hence, by introducing a concept based on nulls, the direction of any target can be established much more precisely. A sharp null can be generated by exciting two antennas out of phase as explained above. As in the previous section, this may also be referred as a Δ beam. If the phase difference is 180°, a sharp null is generated in the broadside direction. By changing the phase difference between the antennas (different from 180°), the direction of the null can be changed. This can then be used as a scanning procedure in order to detect whether tags is present in the current null direction or not. If a tag detected with the sum Σ beam, disappears with the Δ beam, the direction to the tag must be in the direction of the null created by the Δ beam. A procedure that scans a limited angular range in front of an imaging device with a single sum Σ beam and a scanning Δ beam may thus be used to identify the direction to individual tags.

Figure 15:
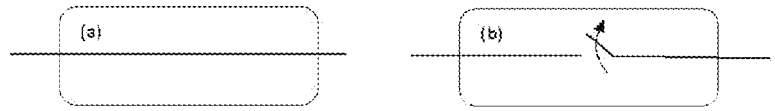
FIG. 15 is a flow chart of a procedure of finding the direction to wireless tags using phase scanning with the Δ beam.

FIG. 15 shows a flow chart of an embodiment of a scanning procedure finding the direction to wireless tags using phase scanning with the Δ beam. Step 1 identifies the wireless ID tags in front of the camera as explained earlier for FIG. 13. The scanning procedure is provided in step 2. An interrogation signal with a Δ beam is transmitted. The wireless response signals from wireless ID tags responding to the wireless interrogation signal are detected and stored together with the identification information related to the object. The identification information may include a tag identification number. If a tag detected with the sum Σ beam, disappears with the Δ beam, the direction to the tag must be in the direction of the null created by the Δ beam. The antenna phase may then be adjusted to place the Δ beam in a different direction. A further interrogation signal is then transmitted in this different direction, followed by detection of wireless response signals as explained above. Any tag in this different direction that was detected with the sum Σ beam, and that disappeared with the Δ beam, is then identified to be in this different direction. Step 2 is repeated until the desired angular area in front of the camera has been scanned.

The second part of the procedure may also be performed by processing the detected signals from the tags acquired in part 1 of the procedure in FIG. 15. This processing may be performed digitally. This alternative method thus does not require a physical transmission of a second interrogation signal. The scanning procedure providing the radiation null may thus be performed in a digital procedure on the signal data from step 1.

This procedure above is thus able to estimate a direction to a wireless tag by using a single image, and does not require a moving image as in the prior art.

C. Reduced Interference from Multipath

Multipath propagation is a general term used to describe the fact that wireless signals usually travel different ways from a transmitter to a receiver. The result is that even though a signal originated from a single point in space, it may be received from multiple directions at the receiver.

In US2005/0104956, it is claimed that the responses from multiple RF tags can be separated by using a moving image. The concept of a moving image is needed in order to obtain a tracking process of the incoming signals, i.e. to identify the directions of maximum signal strength. However, there is no technique introduced in US2005/0104956 that addresses the problem of how to separate a true direction from a false direction caused by multipath propagation. It is inherently assumed that the signal from each individual RF tag is received only from a direction of maximum signal strength, and that the direction of maximum signal strength always represents the true direction to a subject.

Figure 16:
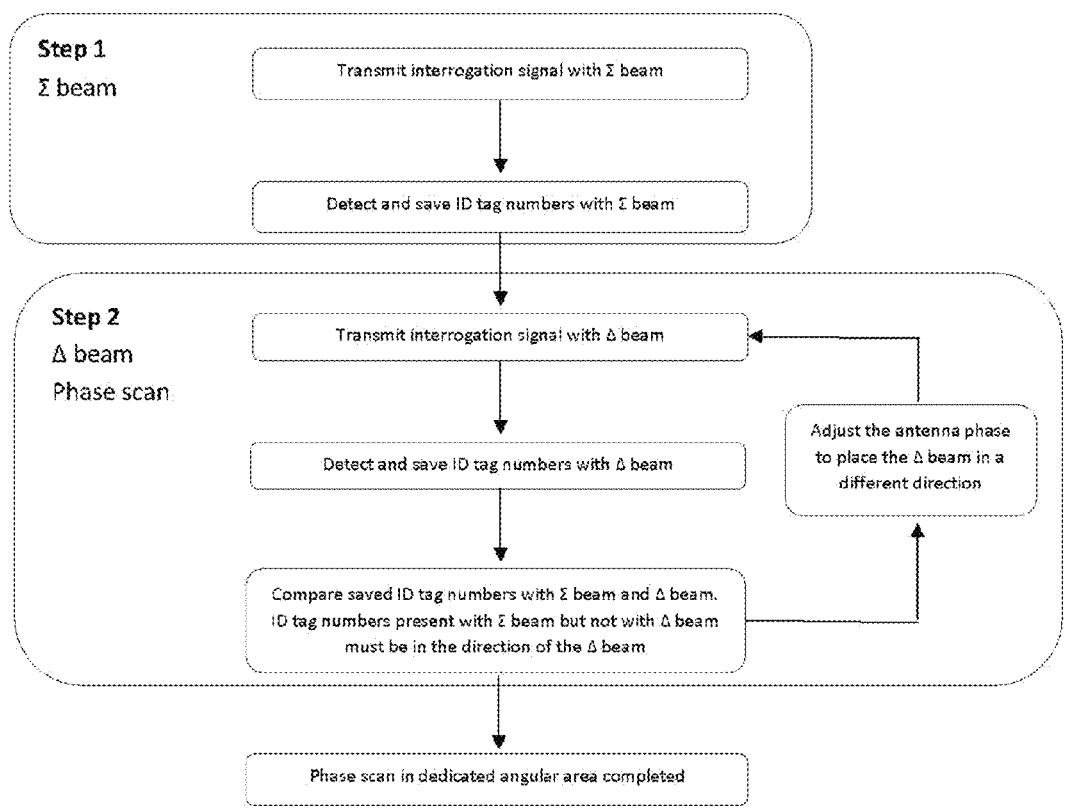
FIG. 16 shows an embodiment where a switch is released after a certain time frame. In the beginning, the switch is closed and signals are allowed to pass directly through the device (a). After a certain time frame, the switch is released and the signal is not able to pass through the device (b).

To reduce the number of incoming signals representing false directions caused by multipath propagation, a procedure may be provided that only allows the wireless response signals from the RF tags that arrive only within a certain time window after the initial request has been transmitted with the Σ beam (interrogation signal). Hence, if the wireless response signal arrives at the sensor and is registered too late, it is interpreted as a multipath signal arriving from a false direction irrespective of its field intensity. An embodiment of implementation of such a procedure is illustrated in FIG. 16. In FIG. 16 a switch, provided in connection with the sensors detecting the wireless response signals, is released a certain time frame after start of transmission of the interrogation signal. First, the switch is closed allowing the detected response signals to pass directly through the device (a). A certain time frame after start of transmission of the interrogation signal, the switch is released and the detected response signal is not able to pass through the device (b). Establishing blocking of signals detected after a certain time window may also be implemented by use of a filter.

The terminal shown in e.g. FIGS. 1(*a*) and 1(*b*), and FIGS. 3-6 provides embodiments of sensor configurations that may be used for performing tracking based on phase differences as explained above. In an embodiment two sensors and a separate transmitter for transmitting the interrogation signal is provided. However, when using sensors in the form of antennas, the antennas may also be configured to function as a transmitter. Thus, if two antennas are provided, these two antennas may thus be configured to operate both as sensors and as transmitters. The antennas may be controlled by a control unit. An estimator unit is provided to estimate a direction to each of the wireless tags based on a phase difference of the wireless response signals detected by the at least two sensors.

In the conventional art, RF tags are commonly used as tags for wireless identification of objects. The present invention is not limited to this type of tags but for simplicity, RF tags have been used to explain example embodiments of the invention.

The examples above are also applicable for electromagnetic signals in the form of infrared light and visible light. Acoustic signals may also be used and the transmitter, sensor and tag are then acoustic devices.

Examples

Uses

Figure 7:
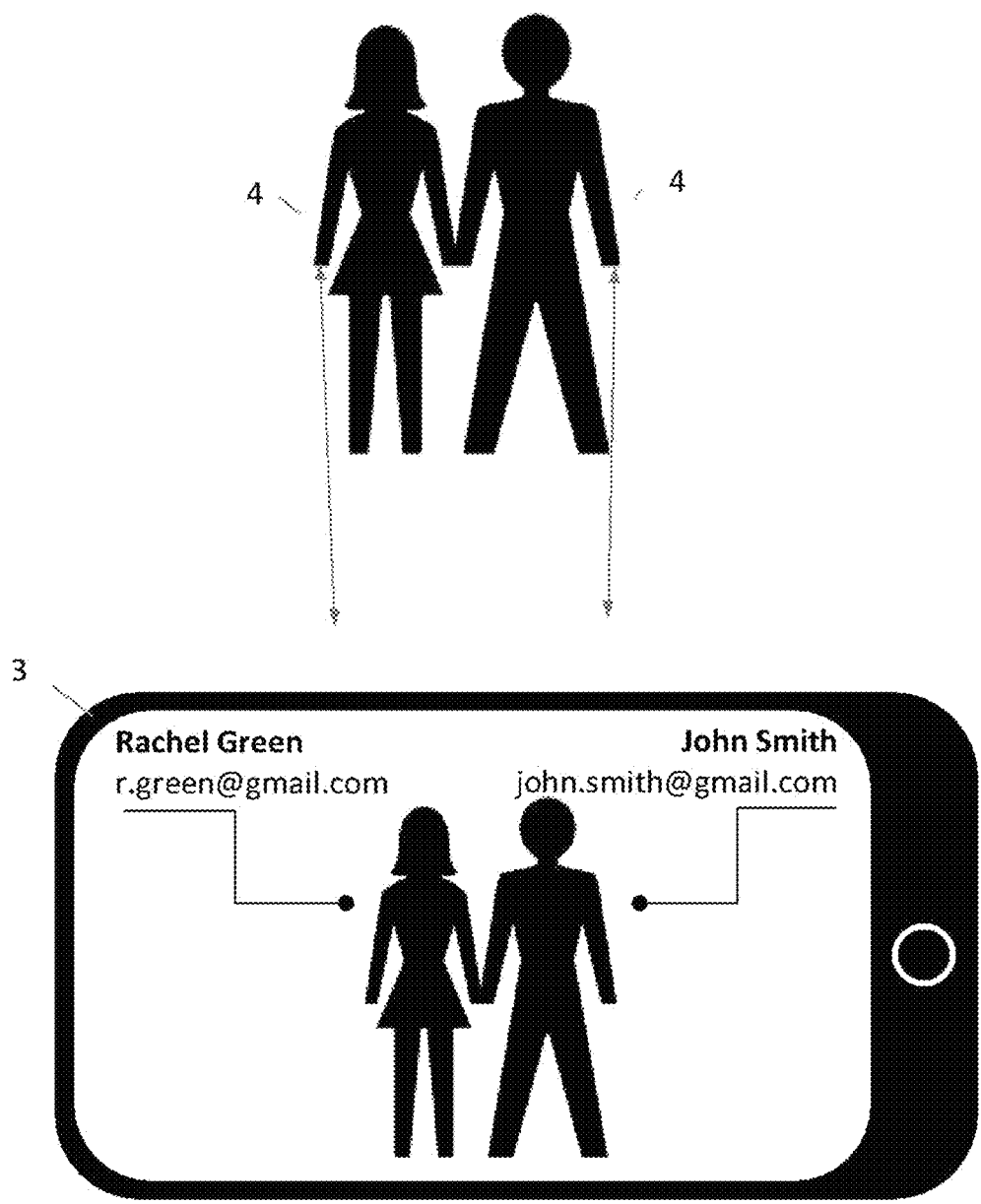
FIG. 7 illustrates use of the terminal for identification of persons.

Detection of Wireless ID Tags Associated with Persons or Products and Their Relative Location in an Image FIG. 7 illustrates identification of persons. Each person is wearing a wireless ID tag 4 on their arm. The persons are displayed on the display device of the terminal 3 and the name and email address of the persons automatically appear in connection with each person as a part of the image.

Figure 8:
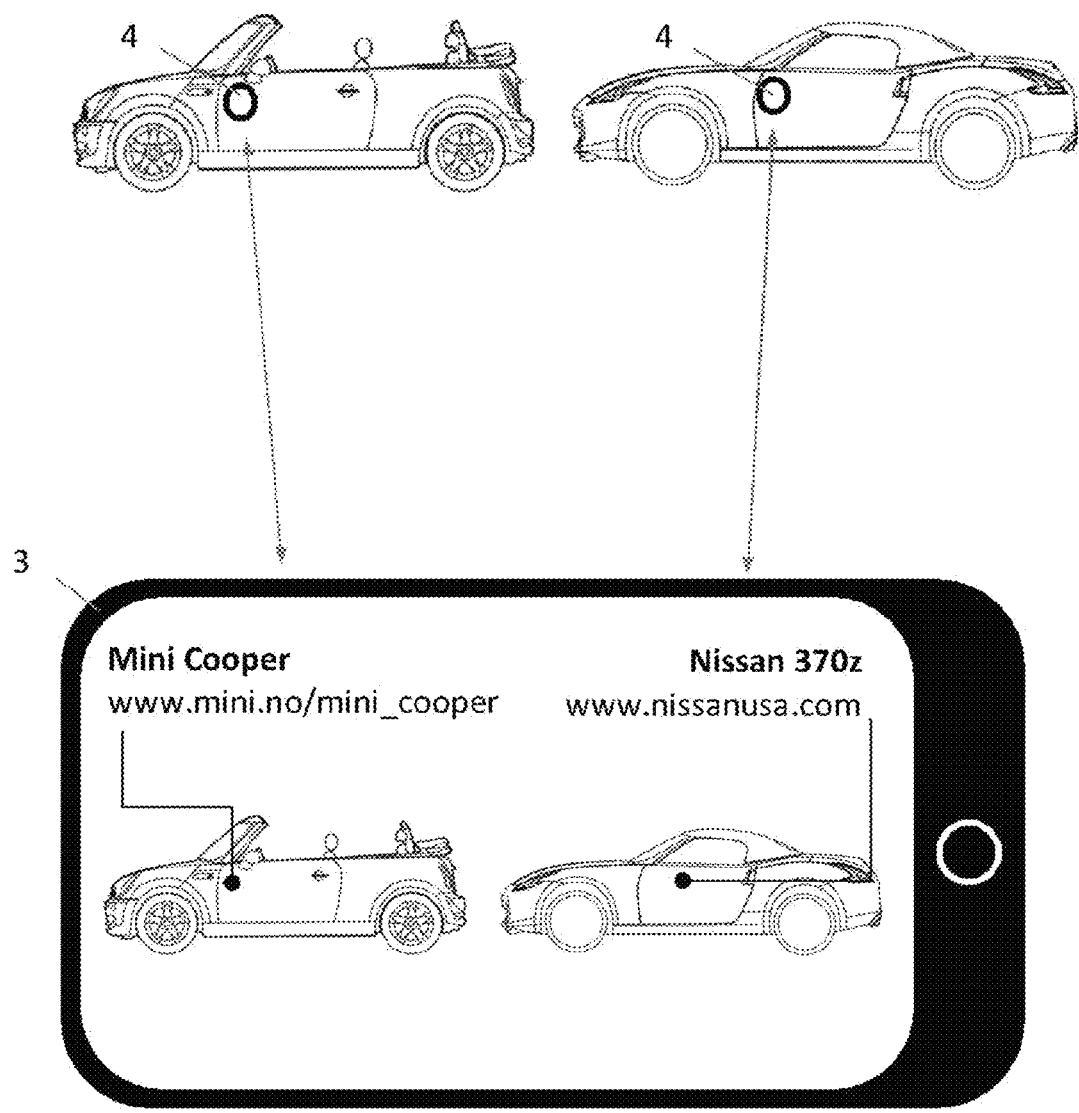
FIG. 8 illustrates use of the terminal for identification of products.
Figure 9:
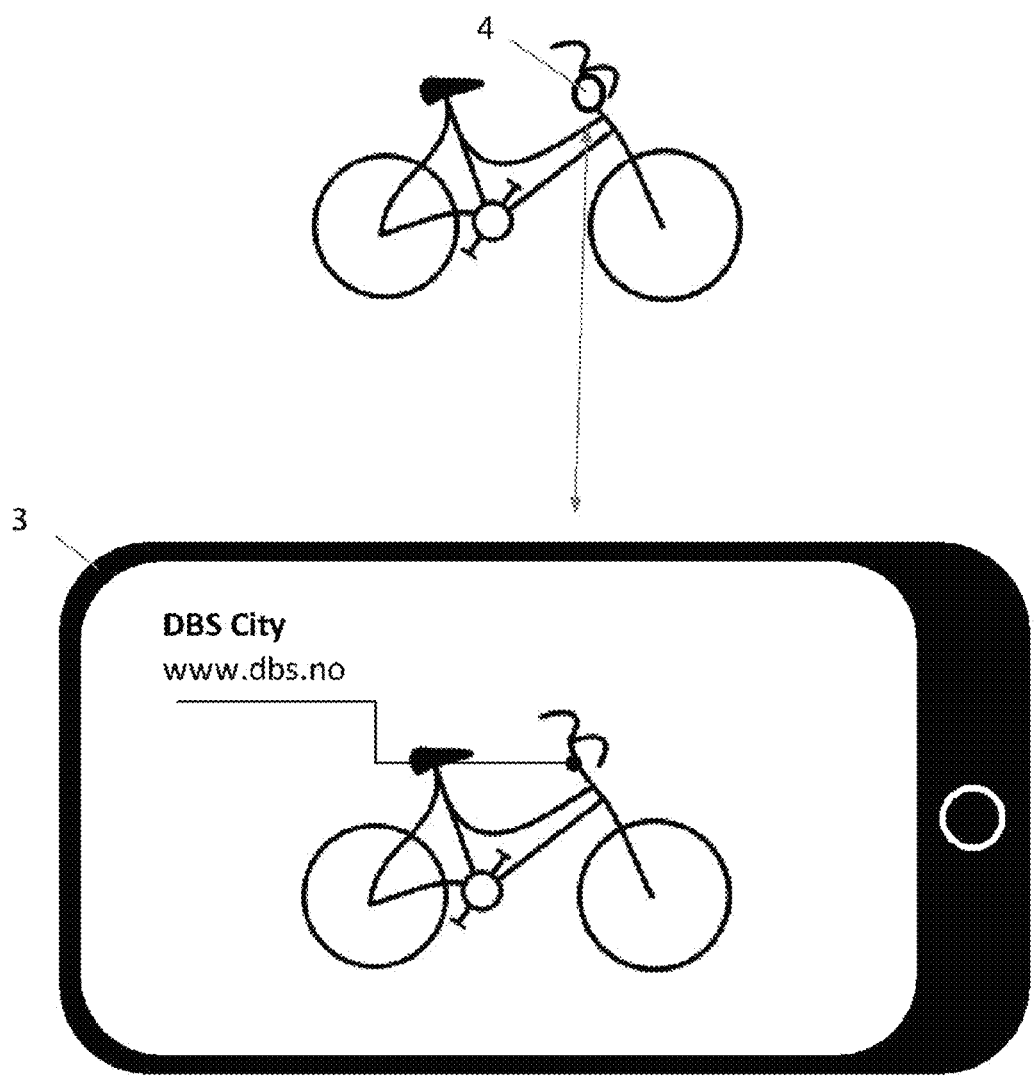
FIG. 9 illustrates use of the terminal for identification of products.
Figure 10:
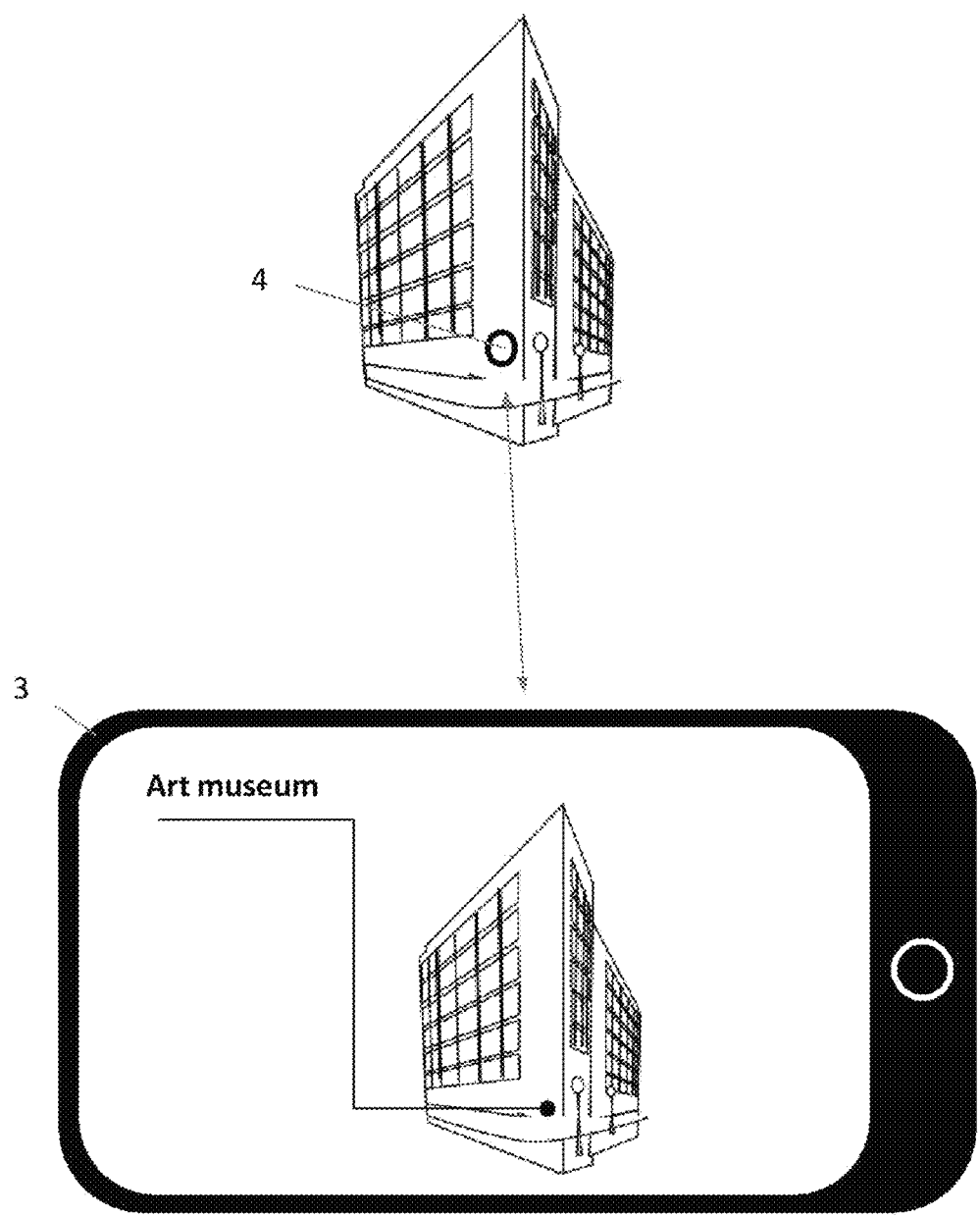
FIG. 10 illustrates use of the terminal for identification of buildings.

FIGS. 8, 9 and 10 illustrate identification of products and buildings. The cars are equipped with wireless ID tags. The imaged cars are displayed on the display device of the terminal and car make and internet address of the car producer appear automatically in connection with each car. The bike is equipped with wireless ID tag in the same way and is displayed by type and internet address. Buildings may also be provided with wireless ID tags as shown with the art museum in FIG. 10. By clicking on the internet address automatic connection to internet for display of more information to the associated marked object is possible.

Figure 11:
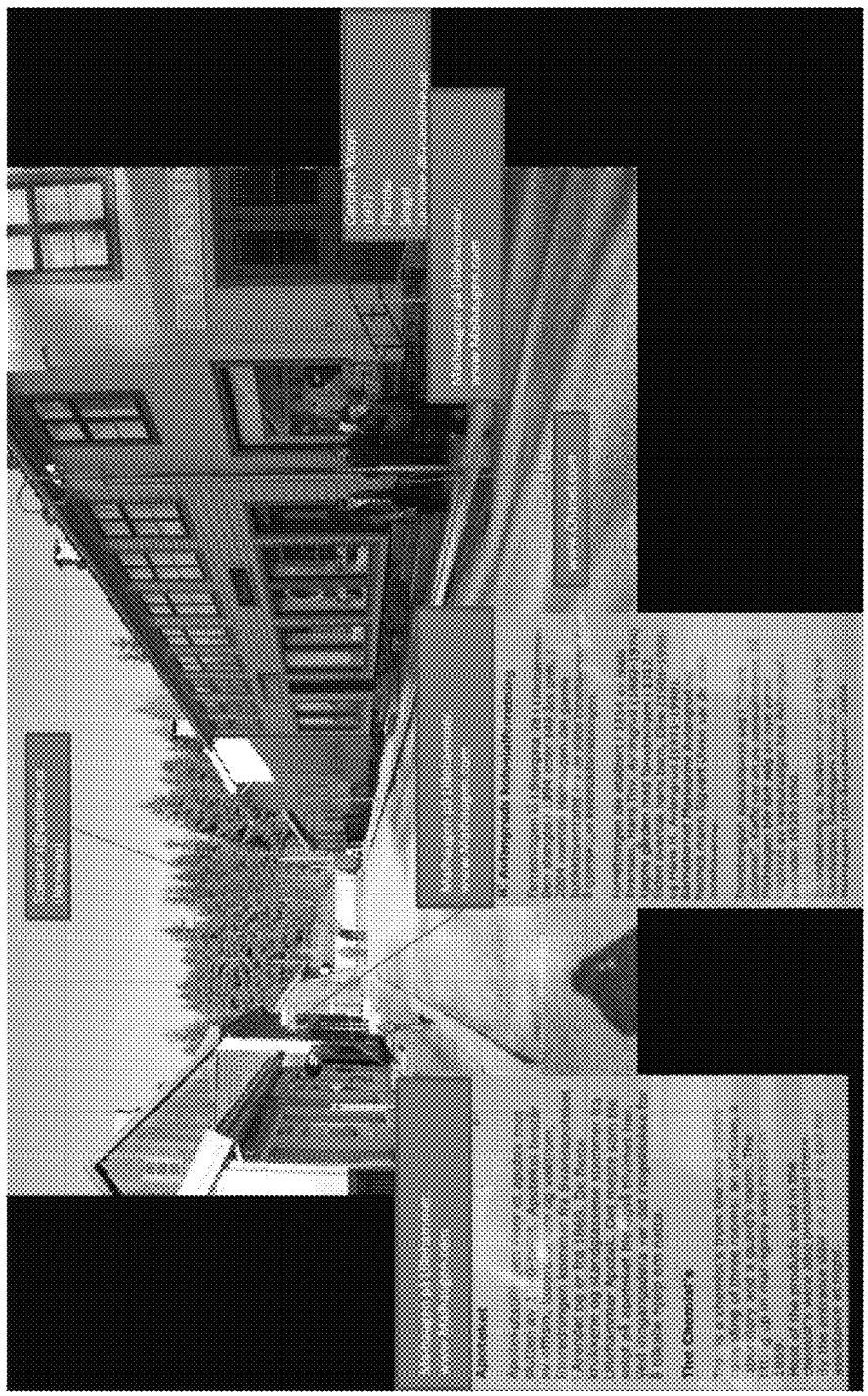
FIG. 11 is an example of a use of the terminal.

FIG. 11 is an illustration example of a use of the present invention. The image is from Maihaugen on Lillehammer. The small rectangular enclosed fields in the image represent information received from the wireless ID tags that were active at the point in time the image was taken. The image provides information about what is in the image (buildings with associated internet address), who is in the image (persons with names and email address), and not at least where in the image the registered information is relevant. I.e. there is a pointer from the information to the point where the different wireless ID tags are located. The larger fields below the small rectangular fields are examples of supplementary information about two of the buildings in the image. The internet links that are shown in the rectangular enclosed fields can be made clickable. If one clicks on the links relevant information as illustrated in the larger fields will appear. In this way the image is provided with an additional value as more information may be attached to the image apart from only the pure visual information. As a consequence of this the image in FIG. 11 may represent a new marketing channel for Maihaugen. If the terminal that took the image was a mobile terminal provided with GPS one would also be able to attach a geographical position to the image such that it would be easy to find the destination Maihaugen on the map. In the example in FIG. 11 there is also put two persons that are being identified in the image with name and email address. These persons can both have transmitted the image via the email address displayed in the image. A product marked with a wireless ID tag is also identified in the image. If one is interested it is possible to follow the link and find out more about just this product.

Product Placement in Connection with Sports Events

The organized may register both who is tagged, what they are tagged with of products etc. After the event (football match/handball match/ice hockey match etc.) the organizer/sponsor may send information to those present and offer products or other information which they find appropriate to share. This may be discounts to future events or offers on new products of the same brand they already uses.

A. Example 1

Personal Tags

FIG. 7 shows an example of personal tags. It shows a situation where a user takes an image of two other persons. It is assumed that the pictured persons both have a mobile device which also serves as a tag. Furthermore, it is assumed that both mobile devices have access to an installed application which makes it possible to select whether the mobile device is going to serve as a tag or not. In this embodiment, it is assumed that both persons have selected to switch their tags to the on position. This means that when a user is taking a picture, both tags will respond with information. It is assumed that each person in this type of application can select individually what type of information they want to present. For example, it may be natural to reveal their names, and the names can be hyperlinks that by clicking on them, a user may be guided to an internet site which provides more information (Facebook or maybe an advertisement of a cultural event that the person will draw attention to). A user may then share this image among his/her friends on a social network, and the recipients will also be able to get the same information as the original user who captured the image. Note that if the two persons are sufficiently separated, the system will be able to distinguish between the positions of the two tags such that each tag is placed on the right person. Hence, if a user does not know who is who, the image will do the job for him. The virtual tags for each person will then be placed in the image in accordance with the actual physical tag positions. If one of the persons deliberately switches the tag to its off position, no information will be available for this person. The person will then be present in the image in the traditional may, i.e. no name or information being available.

B. Example 2

Product Tags

In this embodiment, it is assumed that all imaginable items and products that surround us in our daily lives are tagged objects (furniture, clothes, cars, bicycles, buildings, etc.). FIGS. 8, 9 and 10 are examples of such product tags. In example may be a situation where a user is taking a picture, and one of the imaged persons happens to be wearing a nice (tagged) jacket. The jacket will respond with information, and both the position and the information of the jacket will be accessible through a virtual tag in the interactive image. The present invention allows the user to access the information about that particular jacket as soon as the interactive image is generated. For example, the user may be guided to an online shop where the jacket can be purchased. As such, the present invention can be used as a personal tool to get information about items in your vicinity. However, the present invention has also inherently a characteristic feature which makes it much more than just a personal tool for each individual user. This feature is that all the recipients of the image also will be able to access the same information about the jacket. The concept of product tags and interactive images then becomes a powerful tool for the marketing industry, since personal interactive images can be used to market their products on social networks. And what makes this concept so powerful is the way pictures are circulated in social networks. To understand this, it is important to recognize that people typically select the recipients of an image (or a message) based on its content, since the publisher (which is you) is the one that really knows why the things you want to show (or say) through the image is relevant for exactly the people you have selected as recipients. Hence, a message posted on a social network is often targeted to a dedicated set of people for a particular reason. For example, the same sense of humor, taste, music, clothes, etc. So if you decide to purchase the above jacket online, you may distribute the image to some of your own friends, to let them know that this item is available and that you have purchased it. And you probably know in advance which of your friends that image should be sent to, because you are the one that know them and their taste of style. The result is that the image of that particular jacket starts to circulate among friends on a social network, and not just friends, but friends that have the same taste. Hence, from a marketing perspective, the jacket is advertised for free among exactly the right target group through a self sustaining process. All the manufacturer has to do is to equip their products with information tags so that each time the item is imaged, the products have at least an inherent potential to market themselves. This particular ability makes the present invention a candidate for realizing a new and powerful worldwide marketing channel, where tagged products present in personal images may be circulated and marketed for free on social networks (or on internet in general).

C. Example 3

Aid for Weak-Sighted People

Another use of the present invention is as aid for weak-sighted people. Instead of generating an image, the system can be designed to generate a voice message instead. A similar functionality may already be found in the conventional art, where it is exploited at popular sights or museums through dedicated audio terminals. Typically, they provide information of interesting things found within a confined space. With the present invention, this type of system may be extended to the open space where everyone who needs it can use their own mobile terminals to access the information (smart phone, electronic tablet, digital camera) instead of custom-designed dedicated terminals. The voice message may either be preprogrammed into a tag or the tag may provide a hyperlink to the internet. This particular embodiment makes it possible to weak-sighted people to access information about their immediate surroundings through voice messages.

D. Example 4

Image Database

A social network may be viewed as a market place where thoughts and feelings about things users care for in life is circulated for free. When young people attend rock concerts or festivals, they often publish their presence and excitement on a social network. If they meet celebrities or close friends, it is also common to take pictures of the event and upload it to a social network as evidence of the happening. In places where a lot of people are gathered, it is common that people take pictures, and this makes it possible for other people to be present in other people's images unintentionally (but here not viewed as a negative thing). People may upload their images to an image database so that other people who also may have attended the same event can look to see if they are present in other people's images (once again in a pure positive way). The intention is that people may look for pictures of themselves, regardless of who took the picture. Through this embodiment, people may have captured images that could be valuable to others (that is, people they don't know).

The invention is not limited to the example embodiments described above, and it is apparent that other embodiments may also exist. The invention is defined in the appended claims.

The invention claimed is:

1. A device for identification of at least one object in an image registered with an image registration device, where each of the at least one objects is provided with a wireless tag having stored thereon identification information related to the at least one object, the device for identification comprising:
   at least one transmitter operable for transmitting at least one interrogation signal;
   at least two sensors operable for detecting wireless response signals from wireless tags responding to the at least one interrogation signal, wherein each wireless response signal from the wireless tag comprises identification information related to the at least one object, wherein a direction to each of the wireless tags is estimated based on a phase difference of the wireless response signals detected by the at least two sensors.

2. The device according to claim 1, wherein the at least one interrogation signal comprises a radiation null.

3. The device according to claim 1, wherein the at least one transmitter is provided by at least one of the at least two sensors.

4. The device according to claim 1, wherein the device is operable for allowing detection only of the wireless response signals detected by the at least two sensors within a time window after transmission of the at least one interrogation signal.

5. The device according to claim 1, wherein the at least two sensors and the at least one transmitter are antennas operable for receiving electromagnetic signals.

6. The device according to claim 1, wherein the at least one transmitter is a radio frequency transmitter and the at least two sensors are radio frequency receivers, or the at least one transmitter is an acoustic transmitter and the at least two sensors are acoustic receivers, or the at least one transmitter is an infrared transmitter and the at least two sensors are infrared receivers, or the at least one transmitter is operable to transmit visible light and the at least two sensors are operable to receive visible light.

7. The device according to claim 1, further comprising a processing device suitable for processing of registered identification information from the wireless tags and registered direction of the wireless tags together with image data for the image registered with the image registration device.

8. The device according to claim 7, where the processing device is suitable for performing processing in real time.

9. The device according to claim 1, where the wireless tag is an RFID-tag and the at least two sensors include a first sensor and a second sensor provided in an RFID reader with at least two antennas.

10. The device according to claim 7, where the device is provided with a matrix of RFID antennas.

11. The device according to claim 7, where the RFID tag is an active RFID tag or a passive RFID tag.

12. The device according to claim 1, where the wireless tag is arranged in a terminal, in a cover of a terminal, or on an item to be worn by a person (e.g., in a watch, on jewelry, a bracelet, in an ID card) or in a unit to be arranged on a building or commodity.

13. The device according to claim 1, where the image registration device is a camera or a film/video camera.

14. The device according to claim 1, where the device is integrated in a terminal, wherein the terminal is one of a mobile phone, a camera, a film/video camera, a PC or a tablet.

15. The device according to claim 1, where the device comprising a display device for displaying an image registered with the image registration device.

16. The device according to claim 1, where a sensor for registration of the wireless response signal is arranged in an image registration sensor of the image registration device.

17. The device according to claim 1, where the device is arranged to be mounted on at least one of a mobile phone, a camera, a film/video camera, a PC or a tablet.

18. The device according to claim 1, where the at least one object is at least one of a building, an item/article, a person or an animal.

19. The device according to claim 1, where the identification information is at least one of text, audio, video, name, address, e-mail, used to link to information stored on the internet or reference to information stored on the internet.

20. The device according to claim 1 further comprising a memory unit operable for storing the identification information and position of the identified at least one object together with the image of the at least one object.

21. An imaging device comprising the device for identification of the at least one object in the image according to claim 1.

22. A method for identification of at least one object in an image, wherein each of the at least one objects is provided with a wireless tag having stored thereon identification information related to each of the at least one objects, the method comprising:
   transmitting at least one interrogation signal,
   detecting by at least two sensors wireless signals from wireless tags responding to the at least one the interrogation signal, wherein the wireless signals comprise identification information for the at least one objects; and
   estimating at least one direction of each of the wireless tags responding to the at least one interrogation signal based on a phase difference in the detected wireless signals.

23. The method according to claim 22, wherein the at least one interrogation signal comprising a radiation null.

24. The method according to claim 22, further comprising detecting only the wireless response signals arrived in a time window after transmission of the at least one interrogation signal.

25. The method according to claim 22, wherein the at least one interrogation signal comprises a first radiation pattern with an intensity maximum.

26. The method according to claim 22, wherein the at least one interrogation signal further comprises a second radiation pattern comprising a radiation null.

27. The method according to claim 22, further comprising scanning an angular range in a field of view of the imaging device by using a radiation pattern comprising a radiation null.

28. The method according to claim 22, further comprising scanning an angular range by processing the wireless response signals detected by the at least two sensors.

29. The method according to claim 22, further comprising position determination of the wireless tag.

30. The method according to claim 22, wherein the at least one interrogation signal and the wireless signals are electromagnetic signals or acoustic signals.

31. The method according to claim 30, wherein the electromagnetic signals are radio waves, infrared light or visible light.

32. The method according to claim 22, further comprising registering the image with an image registration device.

33. The method according to claim 22, further comprising processing of registered identification information from the at least one wireless tags and the estimated directions of the at least one wireless tags together with the image data from the image registration device and displaying the image on a display device together with information assigned to each one of the at least one object.

34. The method according to claim 22, where at least one of registering, processing, and displaying are performed in real time.

35. The method according to claim 22, further comprising storing on a storage device the image together with information assigned to each one of the at least one object.

36. A computer program stored on a non-transitory computer readable medium comprising computer readable program code for performing the method for identification of the at least one object according to claim 22.

37. A system for identification of at least one object in an image, the system comprising:
   at least one wireless transponder device suitable to be assigned to an object and providing a wireless tag for the object, the wireless transponder device comprising:
      a storage device for storing identification information for the object, and
      a transmitter for transmitting a wireless signal as a response to an interrogation signal, wherein the wireless signal comprising the stored identification information for the object; and
   the device for identification of the at least one object in the image registered with the image registration device according to claim 1.

38. The system according to claim 37, further comprising a processing device suitable for processing of the registered identification information from the wireless tag and the registered direction of the wireless tag together with the image data of the image registered with the image registration device.

39. A device for identification of at least one object in an image registered with an image registration device, wherein each of the at least one object is provided with a wireless tag, the device comprising at least one sensor for detecting and registering a wireless signal from the wireless tag and for registering at least one direction to the wireless tag based on a phase difference of wireless signals detected by the at least one sensor, and where the wireless signal comprises identification information for the object.

40. The device according to claim 39, further comprising at least one transmitter operable for transmitting at least one interrogation signal,
   wherein the at least one interrogation signal comprises a radiation null.

* * * * *